US012071524B2

(12) United States Patent
Okamoto et al.

(10) Patent No.: US 12,071,524 B2
(45) Date of Patent: Aug. 27, 2024

(54) WATER-SOLUBLE FILM AND PACKAGING MATERIAL

(71) Applicant: KURARAY CO., LTD., Okayama (JP)

(72) Inventors: Minoru Okamoto, Okayama (JP); Sayaka Shimizu, Okayama (JP); Osamu Kazeto, Okayama (JP); Mitsunori Asada, Okayama (JP)

(73) Assignee: KURARAY CO., LTD., Okayama (JP)

( * ) Notice: Subject to any disclaimer, the term of this patent is extended or adjusted under 35 U.S.C. 154(b) by 111 days.

(21) Appl. No.: 17/360,040

(22) Filed: Jun. 28, 2021

(65) Prior Publication Data

US 2021/0324161 A1  Oct. 21, 2021
US 2024/0254294 A9  Aug. 1, 2024

Related U.S. Application Data

(63) Continuation of application No. PCT/JP2019/051491, filed on Dec. 27, 2019.

(30) Foreign Application Priority Data

Dec. 28, 2018  (JP) ................................ 2018-248290

(51) Int. Cl.
*C08J 5/18* (2006.01)
*C08L 29/04* (2006.01)

(52) U.S. Cl.
CPC ............. *C08J 5/18* (2013.01); *C08J 2329/04* (2013.01)

(58) Field of Classification Search
None
See application file for complete search history.

(56) References Cited

U.S. PATENT DOCUMENTS

| | | |
|---|---|---|
| 7,674,518 B2 | 3/2010 | Hayakawa et al. |
| 8,927,061 B2 | 1/2015 | Hikasa et al. |
| 9,908,957 B2 | 3/2018 | Mori et al. |
| 2003/0114332 A1 | 6/2003 | Ramcharan et al. |
| 2007/0087171 A1 | 4/2007 | Hikasa et al. |
| 2011/0236608 A1 | 9/2011 | Vavassori Bisutti |
| 2016/0002422 A1 | 1/2016 | Hochi et al. |
| 2016/0102279 A1 | 4/2016 | Labeque et al. |
| 2016/0194465 A1 | 7/2016 | Takafuji et al. |
| 2016/0340456 A1 | 11/2016 | Mori et al. |
| 2017/0233539 A1 | 8/2017 | Friedrich et al. |
| 2017/0259975 A1 | 9/2017 | Yonezawa et al. |
| 2017/0298155 A1 | 10/2017 | Takafuji et al. |
| 2017/0355938 A1 | 12/2017 | Lee et al. |
| 2018/0245028 A1 | 8/2018 | Ookubo et al. |
| 2018/0251613 A1 | 9/2018 | Hiura et al. |
| 2020/0063076 A1 | 2/2020 | Hiura |
| 2021/0171882 A1 | 6/2021 | Tanikawa et al. |

FOREIGN PATENT DOCUMENTS

| | | | |
|---|---|---|---|
| CA | 3001549 A1 | 10/2017 | |
| CN | 1871138 A | 11/2006 | |
| CN | 107746467 A | 3/2018 | |
| EP | 347219 A | * 12/1989 | ............. A01N 25/34 |
| EP | 3348605 A1 | 7/2018 | |
| EP | 3348608 A1 | 7/2018 | |
| EP | 3677405 A1 | 7/2020 | |
| EP | 3904035 A1 | 11/2021 | |
| EP | 3904231 A1 | 11/2021 | |
| EP | 3904232 A1 | 11/2021 | |
| JP | H06-138321 A | 5/1994 | |
| JP | 10296820 A | * 11/1998 | ............. B29C 47/00 |
| JP | 2000296529 A | 10/2000 | |
| JP | 2001329130 A | 11/2001 | |
| JP | 2002-020507 A | 1/2002 | |
| JP | 2002-030162 A | 1/2002 | |
| JP | 2002-241797 A | 8/2002 | |
| JP | 2002-347112 A | 12/2002 | |
| JP | 2005-194295 A | 7/2005 | |
| JP | 2005179390 A | 7/2005 | |
| JP | 2010-155453 A | 7/2010 | |
| JP | 2014-016649 A | 1/2014 | |
| JP | WO2015/118978 A1 | 8/2015 | |
| JP | 2016060746 A | 4/2016 | |
| JP | WO2016/084836 A1 | 6/2016 | |
| JP | 2016-150769 A | 8/2016 | |
| JP | 2016-222834 A | 12/2016 | |
| JP | WO2016/190235 A1 | 12/2016 | |

(Continued)

OTHER PUBLICATIONS

Machine translation of JP-10296820-A (no date).*
Office Action issued in Japanese Patent Application No. 2020-562508 (corresponding to U.S. Appl. No. 17/359,952) dated Oct. 4, 2022.
Office Action issued in Japanese Patent Application No. 2020-562509 (corresponding to U.S. Appl. No. 17/359,960) dated Oct. 4, 2022.
Office Action issued in Japanese Patent Application No. 2020-562516 (corresponding to U.S. Appl. No. 17/360,098) dated Oct. 4, 2022.
Office Action issued in Japanese Patent Application No. 2020-562510 (corresponding to U.S. Appl. No. 17/359,991) dated Oct. 25, 2022.

(Continued)

*Primary Examiner* — Michael J Feely
(74) *Attorney, Agent, or Firm* — Morgan, Lewis & Bockius LLP

(57) ABSTRACT

A water-soluble film is provided that is capable of achieving deformation resistance during pouch storage as well as excellent water solubility of the film and excellent reduction in undissolved residues. A water-soluble film includes a polyvinyl alcohol-based resin, wherein a crystal long period Ds obtained from an X-ray profile obtained by small-angle X-ray scattering measurement in a water/methanol mixed solvent (volume ratio: 2/8) is from 10.0 to 30.0 nm and a rate of increase $(D_s-D_a)/D_a$ of the crystal long period Ds to a crystal long period Da obtained by small-angle X-ray scattering measurement before immersion in the solvent is 30% or more and 130% or less.

19 Claims, 2 Drawing Sheets

(56) References Cited

FOREIGN PATENT DOCUMENTS

| | | | |
|---|---|---|---|
| JP | WO2017/043505 A1 | 3/2017 | |
| JP | WO2017/043509 A1 | 3/2017 | |
| JP | 2017-078166 A | 4/2017 | |
| JP | 2017-095679 A | 6/2017 | |
| JP | 2017-110213 A | 6/2017 | |
| JP | 2017-114931 A | 6/2017 | |
| JP | 2017-115128 A | 6/2017 | |
| JP | 2017-119434 A | 7/2017 | |
| JP | 2017-119853 A | 7/2017 | |
| JP | 2017-217866 A | 12/2017 | |
| JP | WO2018/230583 A1 | 12/2018 | |
| JP | 2019-044021 A | 3/2019 | |
| JP | WO2019/198683 A1 | 10/2019 | |
| WO | 2009/075202 A1 | 6/2009 | |
| WO | 2013/146147 A1 | 10/2013 | |
| WO | 2014/050696 A1 | 4/2014 | |
| WO | 2017/043508 A1 | 3/2017 | |
| WO | 2017043514 A1 | 3/2017 | |
| WO | 2019/044751 A1 | 3/2019 | |

OTHER PUBLICATIONS

Office Action issued in Japanese Patent Application No. 2020-562513 (corresponding to U.S. Appl. No. 17/360,040) dated Nov. 22, 2022.
Office Action issued in Japanese Patent Application No. 2020-562515 (corresponding to U.S. Appl. No. 17/360,076) dated Sep. 13, 2022.
Office Action issued in related Chinese Patent Application No. 201980086843.9 dated Jul. 25, 2022.
Office Action issued in related Chinese Patent Application No. 201980086787.9 dated Aug. 2, 2022.
International Search Report issued in related International Patent Application No. PCT/JP2019/051491 dated Mar. 24, 2020.
Extended European Search Report issued in related European Patent Application No. 19901491.1 dated Aug. 18, 2022.
Extended European Search Report issued in related European Patent Application No. 19905634.2 dated Aug. 30, 2022.
Shiga et al., "Pulsed NMR Study of the Structure of Poly(vinyl alcohol)-Poly(sodium acrylate) Composite Hydrogel," Journal of Polymer Science: Part B: Polymer Physics, 32: 85-90 (1994).
Takigawa et al., "Structure and mechanical properties of poly(vinyl alcohol) gels swollen by various solvents," Polymer, 33 (11): 2334-2339 (1992).
Extended European Search Report issued in related European Patent Application No. 19903285.5 dated Aug. 24, 2022.
Extended European Search Report issued in related European Patent Application No. 19905828.0 dated Sep. 14, 2022.
Extended European Search Report issued in related European Patent Application No. 19905635.9 dated Sep. 14, 2022.
Extended European Search Report issued in related European Patent Application No. 19902016.5 dated Aug. 18, 2022.
Extended European Search Report issued in related European Patent Application No. 19901493.7 dated Aug. 24, 2022.
Jang et al., "Plasticizer effect on the melting and crystallization behavior of polyvinyl alcohol," Polymer, 44: 8139-8146 (2003).
Peppas, "Infrared spectroscopy of semicrystalline poly(vinyl alcohol) networks," Die Makromolekulare Chemie, 178 (2): 595-601 (1977) (English abstract only).
Extended European Search Report issued in related European Patent Application No. 19903286.3 dated Aug. 24, 2022.
Extended European Search Report issued in related European Patent Application No. 19905031.1 dated Sep. 1, 2022.
Office Action issued in Japanese Patent Application No. 2020-562511 (corresponding to U.S. Appl. No. 17/360,004) dated Jan. 16, 2023.
Office Action issued in Japanese Patent Application No. 2020-562512 (corresponding to U.S. Appl. No. 17/360,018) dated Jan. 16, 2023.
Office Action issued in Chinese Patent Application No. 201980086862.1 (corresponding to U.S. Appl. No. 17/359,952) dated Dec. 5, 2022.
Office Action issued in Chinese Patent Application No. 201980086856.6 (corresponding to U.S. Appl. No. 17/359,960) dated Dec. 27, 2022.
Office Action issued in Chinese Patent Application No. 201980086861.7 (corresponding to U.S. Appl. No. 17/360,040) dated Dec. 7, 2022.
Office Action issued in Chinese Patent Application No. 201980086834.X (corresponding to U.S. Appl. No. 17/360,098) dated Dec. 8, 2022.
Notice of Reasons for Refusal issued in Japanese Patent Application No. 2020-562510 corresponding to U.S. Appl. No. 17/359,991 dated Apr. 10, 2023.
Decision of Refusal issued in Japanese Patent Application No. 2020-562511 corresponding to U.S. Appl. No. 17/360,004 dated Mar. 29, 2023.
Office Action issued in Chinese Patent Application No. 201980086859.X corresponding to U.S. Appl. No. 17/359,991 dated Mar. 3, 2023.
Office Action issued in Chinese Patent Application No. 201980086844.3 corresponding to U.S. Appl. No. 17/360,055 dated Mar. 2, 2023.
Office Action issued in Chinese Patent Application No. 201980086857.0 corresponding to U.S. Appl. No. 17/360,076 dated Feb. 18, 2023.
Office Action issued in Chinese Patent Application No. 201980086834.X corresponding to U.S. Appl. No. 17/360,098 dated Feb. 23, 2023.
Office Action issued in Taiwanese Patent Application No. 108148017 corresponding to U.S. Appl. No. 17/360,098 dated Jan. 19, 2023.
Office Action issued in Japanese Patent Application No. 2020-562512 corresponding to U.S. Appl. No. 17/360,018 dated Jun. 20, 2023.
Office Action issued in Chinese Patent Application No. 201980086856.6 corresponding to U.S. Appl. No. 17/359,960 dated Jun. 21, 2023.
Office Action issued in Chinese Patent Application No. 201980086787.9 corresponding to U.S. Appl. No. 17/360,004 dated Apr. 12, 2023.
Office Action issued in Chinese Patent Application No. 201980086844.3 corresponding to U.S. Appl. No. 17/360,055 dated Jun. 8, 2023.
Office Action issued in the U.S. Appl. No. 17/360,098, dated Sep. 27, 2023.
Office Action issued in the U.S. Appl. No. 17/360,004, dated Oct. 11, 2023.
Office Action issued in the U.S. Appl. No. 17/360,018, dated Oct. 11, 2023.
Office Action issued in the JP Patent Application No. 2020-562512, dated Nov. 28, 2023 (corresponding to U.S. Appl. No. 17/360,018).
Second Office Action issued in Chinese Patent Application No. 201980086859.X dated Jul. 3, 2023, corresponding to U.S. Appl. No. 17/359,991.
Written opposition on JP Application No. 2020-562508, U.S. Pat. No. 7,240,420, dispatched on Oct. 18, 2023—concise explanation in English attached (corresponding to U.S. Appl. No. 17/359,952).
Notice of reasons for revocation on JP Application No. 2020-562508, U.S. Pat. No. 7,240,420, dispatched on Nov. 15, 2023—concise explanation in English attached (corresponding to U.S. Appl. No. 17/359,952).
Trial and Appeal Decision No. 2020-35529, issued on JP Patent No. 2543748.
Office Action issued in the U.S. Appl. No. 17/360,076, dated Feb. 12, 2024.
Office Action issued in the U.S. Appl. No. 17/359,960, dated Feb. 20, 2024.
Office Action issued in the U.S. Appl. No. 17/359,991, dated Feb. 28, 2024.
Office Action issued in the U.S. Appl. No. 17/360,018, dated Mar. 26, 2024.
Office Action issued in the U.S. Appl. No. 17/360,004, dated Mar. 26, 2024.
Office Action issued in the U.S. Appl. No. 17/359,960, dated May 29, 2024.
Office Action issued in the U.S. Appl. No. 17/360,055, dated Apr. 11, 2024.

* cited by examiner

WATER-SOLUBLE FILM AND PACKAGING MATERIAL

TECHNICAL FIELD

The present invention relates to a water-soluble film of a polyvinyl alcohol-based resin that is preferably used for packing various chemicals and the like and a package using the same.

BACKGROUND ART

In the past, taking advantage of the water solubility, water-soluble films have been used in a wide range of fields, including packaging various chemicals, such as liquid detergents, pesticides, and germicides, seed tapes encapsulating seeds, and the like.

For water-soluble films to be used for such an application, polyvinyl alcohol-based resins (hereinafter, may be simply referred to as PVA) are mainly used and films are proposed that have increased water solubility by adding various additives, such as plasticizers, and by using modified polyvinyl alcohol (e.g., refer to PTL 1).

Small-angle X-ray scattering (hereinafter, may be referred to as SAXS) is one of the methods of measuring an average distance between PVA crystals in a film (hereinafter, may be referred to as a crystal long period). This measurement method particularly allows measurement while a film is immersed in a solvent and also allows understanding of a state of changes over a long period of time and the like by SAXS measurement in water. Such a change over time of a water-soluble film in a solvent over a long period is considered to be closely related to dissolution properties of the water-soluble film, whereas the correlation between the PVA long period structure obtained by SAXS measurement and various kinds of performance expected from such a water-soluble film has not been investigated yet.

CITATION LIST

Patent Literature

PTL 1: JP 2017-078166 A

SUMMARY OF INVENTION

Technical Problem

In recent years, pouch products, such as laundry detergents, using a water-soluble film have been sold and they are expected to have performance, as the characteristics, of immediately dissolving the film in water to release the encapsulated detergent. In particular, there is a demand for films to be quickly dissolved even in water under cold conditions, such as the winter season.

Although such a water-soluble film is expected to be sufficiently dissolved in water, undissolved PVA residues used to be sometimes attached on clothes after completion of laundry when, for example, the film is used as a film for packing a laundry detergent and the detergent packing remains wrapped in washed clothes.

In methods in the past, the crystallinity and the like of a film is reduced by a method, such as increasing an amount of plasticizer, to improve the solubility in water. Although such a method gives excellent solubility in water, the method is likely to cause deformation of packages in the case of absorbing moisture during storage of the packages, such as pouches. In particular, a state of high temperature and high humidity is likely to cause deformation and it used to be difficult to develop a PVA film capable of achieving both suppression of attachment of undissolved residues and suppression of deformation during storage in the methods in the past.

It is an object of the present invention to provide a water-soluble film capable of achieving deformation resistance during pouch storage as well as excellent water solubility of the film and excellent reduction in undissolved residues.

Solution to Problem

As a result of an intensive examination, the present inventors have found that the above problems were probably achieved by controlling, to specific values, a crystal long period Ds after immersion when a PVA film is immersed in a water/methanol solvent (volume ratio: 2/8) and a ratio between crystal long periods before and after immersion in the solvent, and they made further investigation based on the findings to complete the present invention.

That is, the present invention relates to what follows.

[1] A water-soluble film comprising a polyvinyl alcohol-based resin, wherein
a crystal long period Ds obtained from an X-ray profile obtained by small-angle X-ray scattering measurement in a water/methanol mixed solvent (volume ratio: 2/8) is from 10.0 to 30.0 nm and a rate of increase $(D_S-D_a)/D_a$ of the crystal long period Ds to a crystal long period Da obtained by small-angle X-ray scattering measurement before immersion in the solvent is 30% or more and 130% or less.

[2] The water-soluble film according to [1], wherein the crystal long period Da of the water-soluble film obtained by small-angle X-ray scattering measurement before immersion in the solvent is from 9.0 to 15.0 nm.

[3] A package comprising: the water-soluble polyvinyl alcohol film according to [1] or [2] and a chemical contained using the water-soluble polyvinyl alcohol film.

[4] The package according to any one of [1] through [3], wherein the chemical is a pesticide, a detergent, or a germicide.

[5] The package according to [3] or [4], wherein the chemical is in a liquid form.

Advantageous Effects of Invention

According to the present invention, it is possible to provide a water-soluble film that is capable of achieving deformation resistance during pouch storage as well as excellent water solubility of the film and tendency of leaving less undissolved residues and a package using the same.

DESCRIPTION OF EMBODIMENTS

Figure 1:
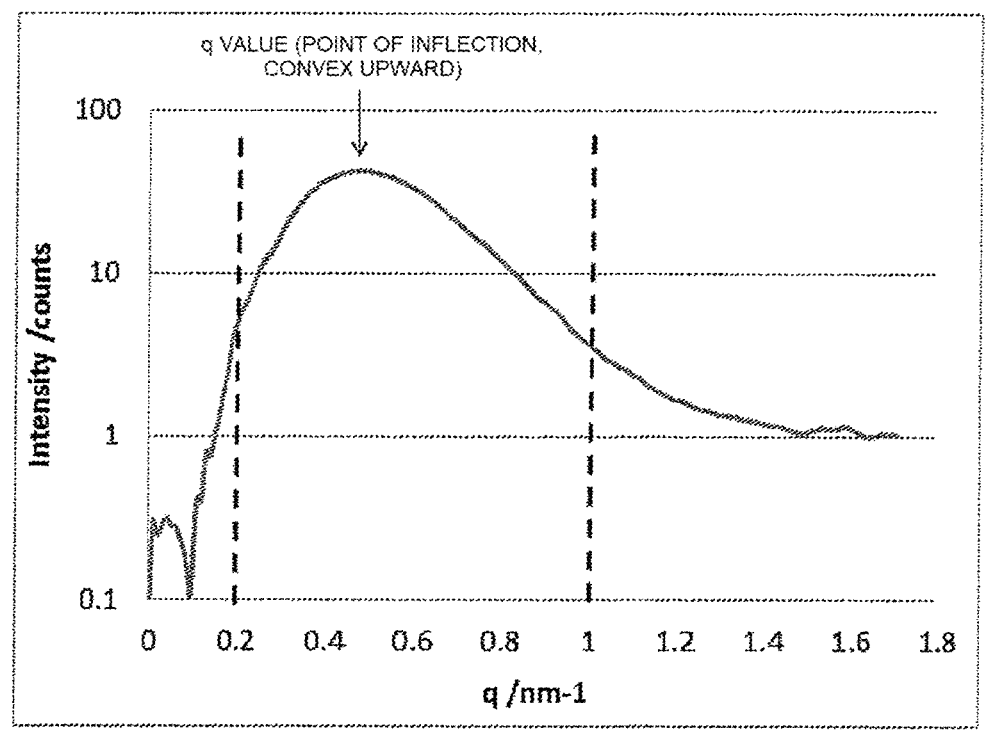
FIG. 1 is a reference chart for setting a q value from the maximum value in a range of 0.2<q<1.0.

The present invention is specifically described below.

Small-Angle X-Ray Measurement

A water-soluble film of the present invention has a crystal long period Ds obtained from an X-ray profile obtained by small-angle X-ray scattering (SAXS) in a mixed solvent of water/methanol=2/8 (volume ratio) from 10.0 to 30.0 nm and a rate of increase (DS−Da)/Da of the crystal long period Ds to a crystal long period Da obtained by small-angle X-ray scattering measurement before immersion in the solvent of 30% or more and 130% or less.

In this context, the small-angle X-ray measurement is based on the measurement principle to analyze diffraction caused as a result of, when a sample is irradiated with X-ray, scattering and interference of the X-ray by electrons around the atom. In particular, this is an analysis technique to measure what appears in a low angle region of $2\theta < 10°$ and evaluate the crystal structure of the substance, and is usually considered to be capable of evaluating a structure in size approximately from several nm to several tens of nm. Use of the diffraction information allows a long period structure, a lamellar structure, and the like of a crystal to be recognized.

When X-ray is incident on a regularly arrayed substance, the X-ray scatters. The scattered X-rays interfere with each other and reinforce each other in a specific direction. According to the Bragg equation, when d denotes a lattice distance, θ denotes a Bragg angle, and λ denotes a wavelength of the X-ray, the diffracted X-rays are observed only in directions satisfying $2d \cdot \sin \theta = n\lambda$.

In the PVA film, it is recognized that a diffraction peak derived from the repetitive structure of a lamellar crystal appears around a long period peak q $(nm^{-1})$ of approximately 0.5. From this peak, the long period size of the lamellar crystal in the water-soluble PVA film is obtained.

Measurement of Crystal Structure

Sample

A formed PVA film is cut into a plurality of sheets in size of 2×1 cm regardless of a width direction (TD) and a winding direction (MD). These samples are stored for 24 hours under the conditions of 20° C. and 65% and ten sheets of them are laminated in a measurement cell to be used for the measurement. The film is also immersed in a solvent (water/methanol mixed solvent (volume ratio: 2/8)), and after 24 hours of immersion, similarly packed in a cell together with a solvent to prepare a measurement sample. The cell has a structure in which a Kapton film with a thickness of 7.5 μm is used as a window material for the incident light side and the reflected light side and a space between the window materials is approximately 1.5 mm to allow tight closure of a sample to be measured. Use of the cell allows placement of the sample in the solvent in an arrangement for usual measurement in an apparatus.

Measurement Apparatus

A nanoscale X-ray structure evaluation apparatus (small-angle X-ray scattering measurement apparatus) "Nano Viewer" (manufactured by Rigaku Corp.)

Measurement Conditions

Transmission Measurement

X-ray: CuKα line
  Wavelength: 0.15418 nm
  Output: 40 kV-20 mA
  First Slit: ϕ0.4 mm
  Second Slit: ϕ0.2 mm
  Third Slit: ϕ0.45 mm
  Detector: Semiconductor Two-Dimensional Detector PILATUS-100K (Measurement Area=33.5×83.8 mm)
  Pixel Size: 0.172 mm square
  Camera Length: 1004.51 mm
  Beam Stopper Diameter: 4 mm
  X-Ray Exposure Time: 1 Hour
  Measurement Mode: Usual Measurement
  Environment Temperature: Room Temperature (22° C.)

Data Analysis

In small-angle X-ray measurement, scatterings from the devices, such as slits, the air in the area where the X-ray passes through, and the solvent in the cell overlap the scattering of the PVA film, and thus these scatterings have to be corrected as the background. In the measurement, correction is performed by separately calculating the scattering intensity resulting from above out of the scattering intensity obtained by measuring the sample and subtracting the calculated intensity from the scattering intensity obtained by measuring the samples.

Further, from a scattering intensity image measured by the two-dimensional detector, the scattering intensity relative to a scattering vector q is integrated in the azimuth direction to derive relationship between the scattering vector q and the one-dimensional profile of the scattering intensity I(q), and thus a scattering curve is obtained.

Calculation of Crystal Long Period

Figure 2:
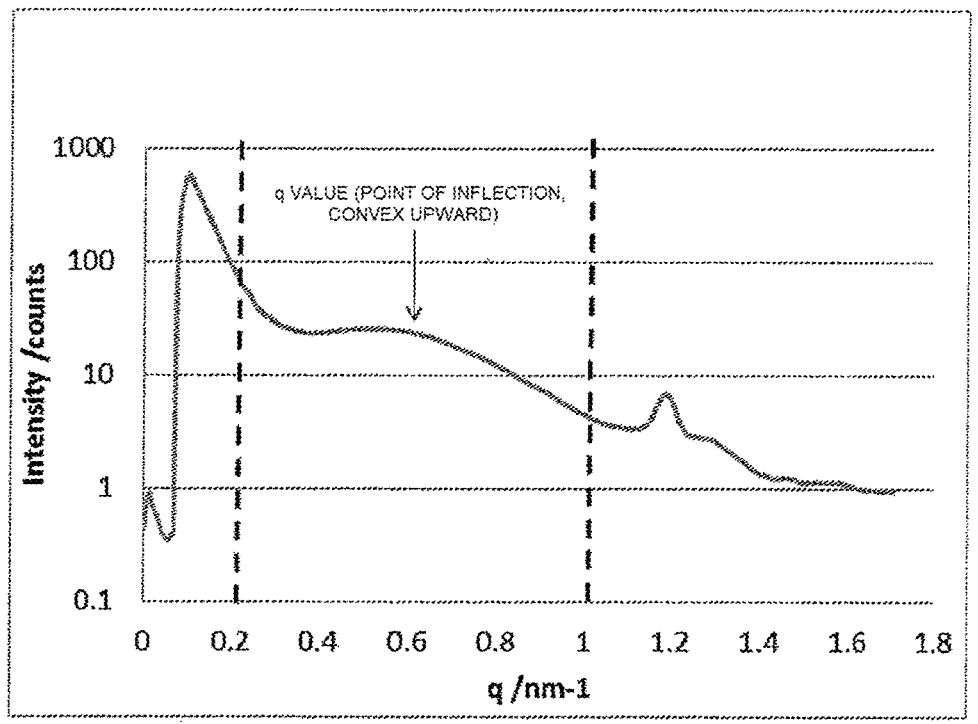
FIG. 2 is a reference chart for setting a q value from the maximum value in a range of 0.2<q<1.0.
Figure 3:
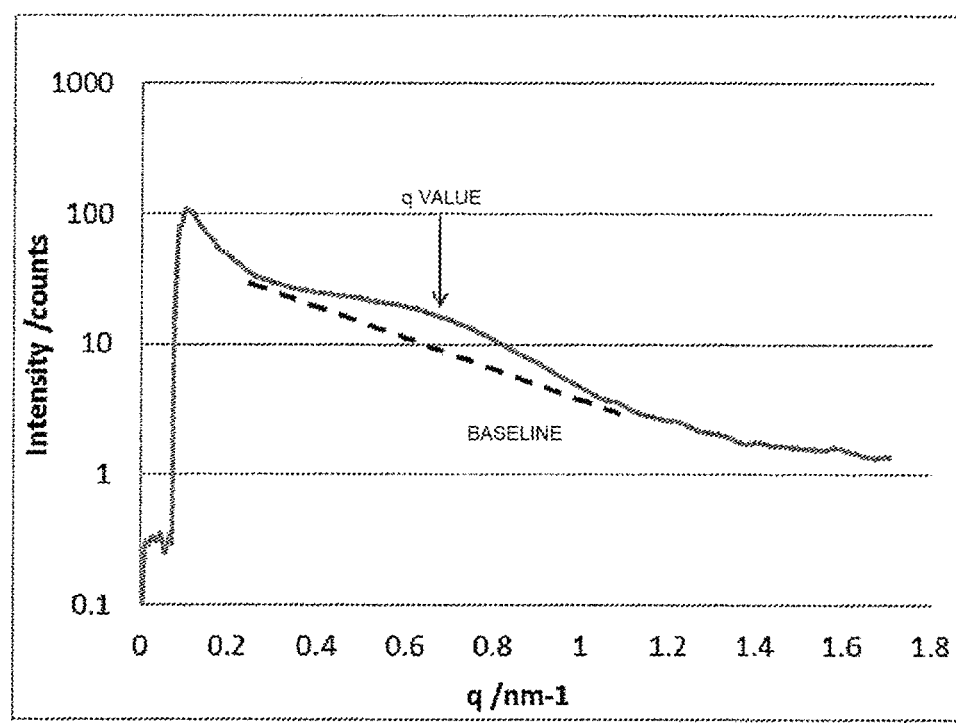
FIG. 3 is a reference chart for setting a q value using a baseline.
Figure 4:
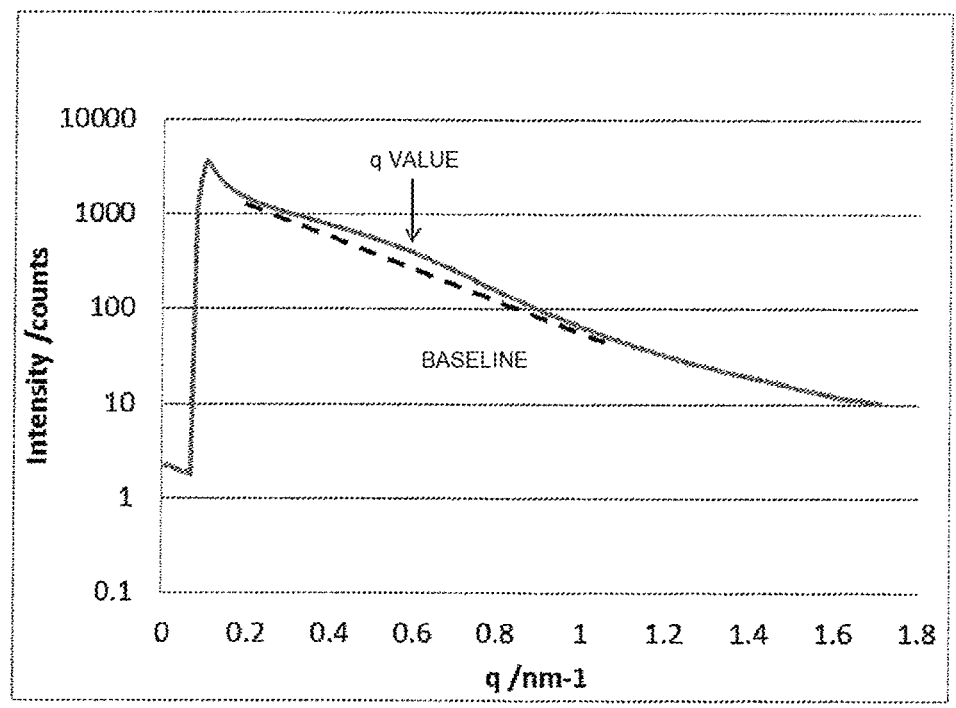
FIG. 4 is a reference chart for setting a q value using a baseline.

As described above, in PVA films, the peak derived from the long period derived from the repetitive structure of the lamellar crystal appears roughly from 0.1 to 1.2 of q $(nm^{-1})$ of the one-dimensional profile. In this embodiment, the position of the peak top that can be confirmed to be derived from the repetitive structure in the one-dimensional profile having the q $(nm^{-1})$ of 0.2 or more and 1.0 or less is defined as a distance of the long period of the lamellar crystal. This peak top is defined as a point of inflection convex upward in the range $(0.2 \leq q \leq 1.0)$ (e.g., FIGS. 1 and 2). When it is difficult to determine the maximum value, a point of the maximum value from the baselines connecting both ends around q=0.2 and 1.0 to form a tangent is defined as the q value (e.g., FIGS. 3 and 4).

From the value of q obtained by the above method, a conversion equation for the crystal long period is as follows.

Lamellar Crystal Long Period Distance (nm)=$2\pi/q$

In the present invention, in the water/methanol mixed solvent having the water/methanol volume ratio of 2/8, the crystal long period Ds obtained by SAXS is from 10.0 to 30.0 nm. Ds of less than 10.0 nm is likely to cause a problem of attachment of PVA residues on clothes and the like in the case of winding a pouch packaging a detergent and the like with the clothes and the like. Ds of more than 30.0 nm is likely to cause problems, such as deformation in a pouch and the like of a detergent and the like using the present film. Ds is preferably from 12.0 to 28.0 nm, more preferably from 14.0 to 26.0 nm, even more preferably from 16.0 to 24.0 nm, and particularly preferably from 18.0 to 22.0 nm.

Ds of less than 10.0 nm is assumed to have a crystal structure in which the distance between the lamellar crystals is short and water does not readily enter the amorphous portion. The crystal structure not causing water to readily enter the amorphous portion is assumed to cause a low dissolution rate of the crystal portion even when the film is immersed in water, facilitating attachment of the PVA residues on clothes and the like. Meanwhile, Ds of more than 30.0 nm is assumed to have a crystal structure in which the distance between the lamellar crystals is long and a large amount of the amorphous portion is contained. The crystal structure containing a large amount of the amorphous portion is assumed to cause deformation of packages by readily absorbing water in an environment at high humidity.

It is also important that, in the present invention, a rate of increase (Ds−Da)/Da of the crystal long period Ds to a crystal long period Da obtained by SAXS before immersion in the water/methanol mixed solvent is 30% or more and 130% or less. An excessively small rate of increase of the crystal long period is considered to cause the distance between the lamellar crystals to be less likely to extend. This is considered because water is not readily incorporated into the amorphous portion, and as a result, the water solubility is insufficient and undissolved residues are produced, likely to cause attachment of the PVA residues on clothes and the like. Meanwhile, an excessively large rate of increase of the crystal long period is considered to facilitate incorporation of water into the amorphous portion, and as a result, an excessive amount of moisture is absorbed in the atmosphere at high humidity and the film becomes too soft during storage of the package, likely to cause deformation.

In the present invention, the crystal long period Da of the water-soluble film before immersion in the mixed solvent measured in air is preferably from 9.0 to 15.0 nm. A crystal long period of less than 9.0 nm is assumed to have a crystal structure in which the distance between the lamellar crystals is short and water does not readily enter the amorphous portion. The crystal structure not causing water to readily enter the amorphous portion causes dissolution in the crystal portion to proceed slower even when the film is immersed in water and more undissolved residues likely to be produced, having a risk of an increase in the attachment of the PVA residues on clothes and the like. Meanwhile, Da of more than 15.0 nm is assumed to have a crystal structure in which the distance between the lamellar crystals is long and a large amount of the amorphous portion is contained. The crystal structure containing a large amount of the amorphous portion causes more reduction in the water resistance and has a risk of facilitating deformation of the pouch.

In the present invention, examples of the method of controlling these parameters in the above range include: (1) a method that adjusts the crystalline state of PVA by controlling the drying and heating conditions for film formation; (2) a method that adjusts the amount and size of crystals by adding a nucleating agent and the like; (3) a method that adjusts the crosslinked structure between molecules of the PVA; and adjustment methods in combination thereof.

Polyvinyl Alcohol-Based Resin

The water-soluble film of the present invention contains a polyvinyl alcohol-based resin. As the PVA, it is possible to use a polymer produced by saponifying a vinyl ester-based polymer obtained by polymerizing a vinyl ester-based monomer. Examples of the vinyl ester-based monomer include vinyl formate, vinyl acetate, vinyl propionate, vinyl valerate, vinyl laurate, vinyl stearate, vinyl benzoate, vinyl pivalate, vinyl versatate, and the like, and among them, vinyl acetate is preferred.

The vinyl ester-based polymer is preferably obtained using only one or more kinds of vinyl ester-based monomer as the monomer and more preferably obtained using only one kind of vinyl ester-based monomer as the monomer, and may be a copolymer of one or more kinds of vinyl ester-based monomer and another monomer copolymerizable therewith.

Examples of such another monomer copolymerizable with the vinyl ester-based monomer include: ethylene; olefins having a carbon number from 3 to 30, such as propylene, 1-butene, and isobutene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof, and N-methylolacrylamide and derivatives thereof; methacrylamide derivatives, such as methacrylamide, N-methylmethacrylamide, N-ethylmethacrylamide, methacrylamidopropanesulfonic acid and salts thereof, methacrylamide propyldimethylamine and salts thereof, and N-methylolmethacrylamide and derivatives thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as acrylonitrile and methacrylonitrile; vinyl halides, such as vinyl chloride, vinylidene chloride, vinyl fluoride, and vinylidene fluoride; allyl compounds, such as allyl acetate and allyl chloride; maleic acid and salts, esters, and acid anhydrides thereof; itaconic acid and salts, esters, and acid anhydrides thereof; vinylsilyl compounds, such as vinyltrimethoxysilane; isopropenyl acetate; and the like. The vinyl ester-based polymer may have a structural unit derived from one or more kinds of such another monomer.

A ratio of the structural unit derived from such another monomer to the vinyl ester-based polymer is preferably 15 mol % or less based on the number of moles of the total structural units constituting the vinyl ester-based polymer, from the perspective of water solubility and film strength, and more preferably 5 mol % or less.

The degree of polymerization of the PVA preferably has the lower limit of, but not particularly limited to, 200 or more from the perspective of the film strength, more preferably 300 or more, and even more preferably 500 or more. Meanwhile, the upper limit of the degree of polymerization is preferably 8,000 or less from the perspective of productivity of the PVA, productivity of the PVA film, and the like, more preferably 5,000 or less, and even more preferably 3,000 or less. In this context, the degree of polymerization means an average degree of polymerization measured in accordance with the description of JIS K 6726-1994 and is obtained by a following formula from the limiting viscosity [η] (unit: deciliter/g) measured, after resaponifying and purifying the PVA, in water at 30° C.

$$\text{Degree of Polymerization } P_o = ([\eta] \times 10^4/8.29)^{(1/0.62)}$$

In the present invention, the degree of saponification of the PVA is preferably from 64 to 93 mol %. Adjustment of the degree of saponification in this range facilitates achievement of both the water solubility and the physical properties of the film. The lower limit of the degree of saponification is more preferably 70 mol % or more and even more preferably 75 mol % or more. Meanwhile, the upper limit of the degree of saponification is more preferably 91 mol % or less and even more preferably 90 mol % or less. In this context, the degree of saponification of the PVA means a ratio (mol %) indicating the number of moles of the vinyl alcohol units based on the total number of moles of the structural units (typically, vinyl ester-based monomer units)

that may be converted to vinyl alcohol units by saponification and the vinyl alcohol units in the PVA. The degree of saponification of the PVA-based polymer may be measured in accordance with the description of JIS K6726-1994.

The water-soluble film in the present invention may singly use one kind of PVA as the PVA or may use by blending two or more kinds of PVA having a degree of polymerization, a degree of saponification, a degree of modification, or the like different from each other.

In the present invention, the upper limit of the PVA content in the water-soluble film is preferably 100 mass % or less. Meanwhile, the lower limit of the PVA content is preferably 50 mass % or more, more preferably 80 mass % or more, and even more preferably 85 mass % or more.

Plasticizer

In the state of containing no plasticizer, water-soluble films are rigid compared with other plastic films and sometimes have problems of the mechanical properties, such as impact strength, processability during fabrication, and the like. To prevent these problems, the water-soluble film of the present invention preferably contains a plasticizer. Examples of preferred plasticizers include polyhydric alcohols, and specific examples include polyhydric alcohols, such as ethylene glycol, glycerin, diglycerin, propylene glycol, diethylene glycol, triethylene glycol, tetraethylene glycol, trimethylolpropane, and sorbitol, and the like. One kind of these plasticizers may be singly used or two or more kinds of them may be used together. Among these plasticizers, from the perspective of not readily bleeding out on a surface of the film and the like, ethylene glycol or glycerin are preferred and glycerin is more preferred.

Adjustment of the amount of the plasticizer to be contained in the water-soluble film allows adjustment of the crystallite size and the degree of crystallization. Although depending on the primary structure of the molecular chain, a water-soluble film containing a small amount of the plasticizer generally facilitates proceedings of the crystallization by heat treatment compared with water-soluble films containing no plasticizer. This is assumed to be because the PVA molecules are facilitated to move and thus facilitated to form a crystal structure, which is energetically more stable. In contrast, a water-soluble film containing an excessive amount of the plasticizer on the contrary inhibits proceedings of crystallization. This is assumed to be because the amount of the plasticizer interacting with the hydroxyl groups in the PVA molecules is large to cause reduction in the interaction between the PVA molecules. From the perspective of regulating the degree of crystallization and the crystallite size of the film thus obtained in an appropriate range, the content of the plasticizer is preferably from 8 to 35 parts by mass based on 100 parts by mass of the PVA. The content of the plasticizer of both less than 8 parts by mass and more than 35 parts by mass based on 100 parts by mass of the PVA has a risk of causing a too small degree of crystallization, too small crystallite size, or both being too small. The content of the plasticizer based on 100 parts by mass of the PVA is more preferably from 10 to 30 parts by mass and even more preferably from 15 to 25 parts by mass.

Starch/Water-Soluble Polymer

For the purpose of imparting mechanical strength to the water-soluble film, maintaining the moisture resistance for handling the film, regulating the rate of flexibilization due to water absorption during the dissolution of the film, or the like, the film of the present invention may contain starch and/or a water-soluble polymer other than PVA.

Examples of the starch include: natural starches, such as corn starch, potato starch, sweet potato starch, wheat starch, rice starch, tapioca starch, and sago starch; processed starches subjected to etherification, esterification, oxidation, and the like; and the like, and processed starches are particularly preferred.

The content of the starch in the water-soluble film is preferably 15 parts by mass or less based on 100 parts by mass of the PVA and more preferably 10 parts by mass or less. A content of the starch of more than 15 parts by mass has a risk of worsening the processability.

Examples of the water-soluble polymer other than PVA include dextrin, gelatin, glue, casein, shellac, gum arabic, polyacrylic acid amide, sodium polyacrylate, polyvinyl methyl ether, copolymers of methyl vinyl ether and maleic anhydride, copolymers of vinyl acetate and itaconic acid, polyvinylpyrrolidone, cellulose, acetylcellulose, acetylbutylcellulose, carboxymethylcellulose, methylcellulose, ethylcellulose, hydroxyethylcellulose, sodium alginate, and the like.

The content of the water-soluble polymer other than PVA in the water-soluble film is preferably 15 parts by mass or less based on 100 parts by mass of the PVA and more preferably 10 parts by mass or less. A content of the water-soluble polymer other than PVA of more than 15 parts by mass has a risk of causing insufficient water solubility of the film.

Surfactant

In the present invention, the water-soluble film preferably contains a surfactant from the perspective of improving the handleability, the releasability of the water-soluble film from the apparatus for film formation during production, and the like. The kind of the surfactant is not particularly limited and examples include anionic surfactants, nonionic surfactants, and the like.

Examples of such an anionic surfactant include: carboxylic acid-based surfactants, such as potassium laurate; sulfuric ester-based surfactants, such as octyl sulfate; sulfonic acid-based surfactants, such as dodecylbenzenesulfonate; and the like.

Examples of such a nonionic surfactant include: alkyl ether-based surfactants, such as polyoxyethylene lauryl ether and polyoxyethylene oleyl ether; alkylphenyl ether-based surfactants, such as polyoxyethylene octylphenyl ether; alkyl ester-based surfactants, such as polyoxyethylene laurate; alkylamine-based surfactants, such as polyoxyethylene laurylamino ether; alkylamide-based surfactants, such as polyoxyethylene lauric acid amide; polypropylene glycol ether-based surfactants, such as polyoxyethylene polyoxypropylene ether; alkanolamide-based surfactants, such as lauric acid diethanolamide and oleic acid diethanolamide; allyl phenyl ether-based surfactants, such as polyoxyalkylene allyl phenyl ether; and the like.

One kind of the surfactants may be singly used or two or more kinds of them may be used together. Among these surfactants, due to an excellent effect of reducing film surface irregularities during formation and the like, nonionic surfactants are preferred, and in particular alkanolamide-based surfactants are more preferred, and dialkanolamide (e.g., diethanolamide, etc.) of aliphatic carboxylic acid (e.g., saturated or unsaturated aliphatic carboxylic acid having a carbon number from 8 to 30, etc.) is even more preferred.

The content of the surfactant in the water-soluble film is preferably 0.01 part by mass or more based on 100 parts by mass of the PVA, more preferably 0.02 parts by mass or more, and even more preferably 0.05 parts by mass or more. Meanwhile, the upper limit of the content of the surfactant is preferably 10 parts by mass or less, more preferably 1 part by mass or less, even more preferably 0.5 parts by mass or less, and particularly preferably 0.3 parts by mass or less. A content of the surfactant of less than 0.02 parts by mass causes poor releasability of the water-soluble film from the apparatus for film formation during production or is likely to cause problems of blocking between the films and the like. Meanwhile, a content of the surfactant of more than 1 part by mass is likely to cause problems of bleeding out of the surfactant on a film surface, deterioration of the appearance of the film due to aggregation of the surfactant, and the like.

PVA Cross-Linking Agent

Formation of intermolecular crosslinks and intramolecular crosslinks by containing a cross-linking agent in the water-soluble film is also one of the methods of obtaining the water-soluble film of the present invention. An example of the crosslinking method is a method that crosslinks molecular chains of the PVA to each other by acetal crosslinking, and in that case, it is possible to preferably use, as the cross-linking agent, aldehydes, such as glutaraldehyde, formaldehyde, glyoxal, benzaldehyde, succinaldehyde, malondialdehyde, adipaldehyde, terephthalaldehyde, and nonanedial. There is also a method that crosslinks PVA with a boron-based material, and in that case, it is possible to preferably use, as the cross-linking agent, boric acid, metaboric acid, and polyboric acid.

A method of containing the cross-linking agent in the water-soluble film is not particularly limited, and examples of preferred methods include: a method that adds the cross-linking agent in a PVA stock solution; a method that impregnates the water-soluble film in a liquid containing the cross-linking agent by immersion; a method that diffuses the cross-linking agent in the water-soluble film by exposing the film to gas containing the cross-linking agent; and the like. For the production costs, the uniform crosslinking, and the like, the method that adds the cross-linking agent in a PVA stock solution is preferred.

The amount of the cross-linking agent to be added is, but not limited to, preferably from 0.02 to 4 mass %. An amount of the cross-linking agent of less than 0.02% has a risk of not obtaining a significant effect of adding the cross-linking agent. Meanwhile, an amount of the cross-linking agent of more than 4% has a risk of causing problems of reduction in water solubility and the like.

Other Components

In addition to the plasticizer, the starch, the water-soluble polymer other than PVA, and the surfactant, without impairing the effects of the present invention, the water-soluble film of the present invention may contain components, such as moisture, antioxidants, ultraviolet absorbers, lubricants, colorants, fillers, antiseptics, mildewcides, and other polymer compounds.

The ratio of the summed mass of the respective mass of the PVA, the plasticizer, the starch, the water-soluble polymer other than PVA, and the surfactant to the total mass of the water-soluble film of the present invention is preferably in a range from 60 to 100 mass %, more preferably in a range from 80 to 100 mass %, and even more preferably in a range from 90 to 100 mass %.

Water-Soluble Film

Complete dissolution time of the water-soluble film of the present invention immersed in deionized water at 10° C. (hereinafter, may be referred to as complete dissolution time) is preferably 150 seconds or less. The complete dissolution time of 150 seconds or less allows preferred use as a film for packaging chemicals and the like. The complete dissolution time is more preferably 90 seconds or less, even more preferably 60 seconds or less, and particularly preferably 45 seconds or less. Meanwhile, the lower limit of the complete dissolution time is preferably, but not particularly limited to, 5 seconds or more, more preferably 10 seconds or more, even more preferably 15 seconds or more, and particularly preferably 20 seconds or more because a water-soluble film having too short complete dissolution time tends to cause problems of blocking between the films due to moisture absorption in the atmosphere, deformation of packages due to reduction in film strength, and the like.

The thickness of the water-soluble film of the present invention is preferably, but not particularly limited to, 200 μm or less, more preferably 150 μm or less, even more preferably 100 μm or less, and particularly preferably 50 μm or less because a too large thickness tends to cause worsening of fabricability. Because a too small thickness has a risk of causing a problem in the mechanical strength of the water-soluble film, the thickness is preferably 5 μm or more, more preferably 10 μm or more, even more preferably 15 μm or more, and particularly preferably 20 μm or more. It should be noted that the thickness of the water-soluble film may be obtained as an average value of thicknesses measured at ten arbitrary spots (e.g., ten arbitrary spots on a straight line in the longitudinal direction of the water-soluble film).

Method of Producing Water-Soluble Film

A method of forming the water-soluble film in the present invention may be an arbitrary method, such as a film formation method where a solvent, additives, and the like are added to PVA and homogenized to obtain a film forming stock solution to be used in casting film formation, wet film formation (discharge into a poor solvent), dry/wet film formation, gel film formation (a method where the film forming stock solution is temporarily cooled to form a gel and then the solvent is extracted and removed to obtain a PVA-based polymer film), and combination thereof, melt extrusion film formation where the above film forming stock solution thus obtained is extruded from a T die or the like using an extruder or the like, inflation molding, and the like. Among them, casting film formation or melt extrusion film formation is preferred for allowing a homogeneous PVA film to be productively obtained. A description is given below to casting film formation or melt extrusion film formation of the water-soluble film.

In a case of forming the water-soluble film by casting film formation or melt extrusion film formation, the above film forming stock solution is casted in the form of film on a support, such as a metal roll and a metal belt and heated to remove the solvent and thus solidified to be formed into a film. The solidified film is released from the support, dried as needed by a drying roll, a drying furnace, and the like, and further heat treated as needed to be wound and thus allowed to be produced into a long water-soluble film in a roll.

While the PVA film casted on the support is dried by heating on the support and in the following drying process, crystallization proceeds. Particularly, heating in a region with a high moisture content increases the mobility of the molecular chain of the PVA and thus crystallization proceeds, causing an increase in the degree of crystallization. Accordingly, a too high drying rate causes insufficient growth of the crystal and has a risk of resulting in an insufficient degree of crystallization. In contrast, a too low drying rate accelerates crystal growth and tends to cause an increase in the crystallite size. A too large amount of heat to be provided causes an increase in the degree of crystallization and has a risk of causing insufficient water solubility.

The concentration of volatile components (concentration of the volatile components, such as the solvent removed by volatilization and evaporation during film formation and the like) in the film forming stock solution is preferably in a range from 50 to 90 mass % and more preferably in a range from 55 to 80 mass %. The concentration of volatile components of less than 50 mass % causes an increase in the viscosity of the film forming stock solution and sometimes causes difficulty in film formation. Meanwhile, the concentration of volatile components of more than 90 mass % causes a decrease in the viscosity and is likely to impair uniformity in the thickness of the film to be obtained.

In this context, a "ratio of volatile components in the film forming stock solution" herein means a ratio of volatile components obtained by the following formula.

Ratio of Volatile Components in Film Forming Stock Solution (mass %)={(Wa−Wb)/Wa}×100

(In the formula, Wa denotes the mass (g) of the film forming stock solution and Wb denotes the mass (g) of the film forming stock solution after Wa (g) of the solution is dried in an electric heat drier at 105° C. for 16 hours.)

Examples of the method of adjusting the film forming stock solution include, but not particularly limited to, a method where PVA and the additives, such as a plasticizer and a surfactant, are dissolved in a dissolution tank or the like, a method where PVA in a hydrated state is melt kneaded together with a plasticizer, a surfactant, and the like, using a single- or twin-screw extruder, and the like.

When the water-soluble film is formed by casting film formation or melt extrusion film formation, the film forming stock solution is casted in the form of film on a support, such as a metal roll and a metal belt, from a film-form discharge apparatus and heated to remove the solvent, and thus solidified to be formed into a film.

In the water-soluble film of the present invention, a rate of increase of crystal long periods before and after immersion in the water/methanol mixed solvent is in a specific range. The rate of increase is assumed to be influenced by the degree of entanglement of the molecular chains in an amorphous region between crystals, and thus one of the effective methods for controlling the rate of increase is adjustment of the shearing rate at the exit of the film-form discharge apparatus where a strong shearing force is applied to the film forming stock solution.

The shearing rate at the exit of the film-form discharge apparatus is preferably from 75 to 1000 $s^{-1}$ because the water-soluble film of the present invention is readily obtained. The shearing rate at the exit of the film-form discharge apparatus is more preferably from 100 to 900 $s^{-1}$ and even more preferably from 125 to 800 $s^{-1}$. Both excessively low and excessively high shearing rates tend to cause too much water to enter the amorphous portion.

In the present invention, the shearing rate at the exit of the film-form discharge apparatus indicates a shearing rate on the wall of a film forming stock solution channel in the die lips in the case of a general T die or I die, and it is possible to calculated by a formula below.

$$\gamma = 6Q/Wh^2$$

In this formula, $\gamma$ denotes the shearing rate ($s^{-1}$) on the wall, W denotes the width (cm) of the die lips, h denotes the degree of opening (cm) of the die lips, and Q denotes the discharge rate (cm³/s) of the film forming stock solution from the die lips.

The surface temperature of the support for casting of the film forming stock solution is preferably from 50° C. to 110° C. A surface temperature of less than 50° C. not only causes slow drying and proceedings of crystallization to worsen water solubility but also increases the time taken for drying and tends to reduce the productivity. A surface temperature of more than 110° C. tends to cause irregularities on the film surface, such as foaming, and causes an increase in the amorphous component due to rapid drying and tends to have a too small degree of crystallization. From the perspective of facilitating regulation of the PVA crystal long period structure, the surface temperature is more preferably from 60° C. to 100° C. and still more preferably from 65° C. to 95° C.

Simultaneously with heating of the PVA film on the support, hot air at a wind velocity from 1 to 10 m/second may be uniformly blown on the entire region on a non-contact surface side of the PVA film to regulate the drying rate. The temperature of the hot air blown on the non-contact surface side is preferably from 50° C. to 150° C. and more preferably from 70° C. to 120° C. from the perspective of efficiency and uniformity of drying and the like.

The film released from the support is preferably dried to a ratio of volatile components from 5 to 50 mass % on the support and then released, and further dried as needed. Examples of the drying method include, but not particularly limited to, a method including contacting a drying furnace and a drying roll. In the case of drying with a plurality of drying rolls, it is preferred that one surface and the other surface of the film alternately contact the drying rolls for homogenization of both surfaces. The number of drying rolls is preferably three or more, more preferably four or more, and even more preferably from 5 to 30. The temperature of the drying furnace or the drying roll(s) is preferably 40° C. or more and 110° C. or less. The upper limit of the temperature of the drying furnace or the drying roll(s) is more preferably 100° C. or less, more preferably 90° C. or less, and even more preferably 85° C. or less. An excessively high temperature of the drying furnace or the drying roll(s) has a risk of causing a too large degree of crystallization. Meanwhile, the lower limit of the temperature of the drying furnace or the drying roll(s) is more preferably 45° C. or more and even more preferably 50° C. or more. An excessively low temperature of the drying furnace or the drying roll(s) has a risk of causing an excessive increase in the amorphous portion.

The water-soluble film may further be heat treated as needed. The heat treatment allows adjustment of strength, water solubility, and index of double refraction, and the like of the film. The temperature of the heat treatment is preferably 60° C. or more and 135° C. or less. The upper limit of the heat treatment temperature is more preferably 130° C. or less. An excessively high heat treatment temperature causes a too large amount of heat to be provided and has a risk of causing an excessive increase in the degree of crystallization.

The water-soluble film thus produced is subjected to further humidity control, cutting of both edges (trimmings) of the film, and the like as needed, and wound in a roll on a cylindrical core and moistureproof packaged to be a product.

The ratio of volatile components in the water-soluble film finally obtained through the series of treatment described above is preferably, but not particularly limited to, from 1 to 5 mass % and more preferably from 2 to 4 mass %.

Applications

The water-soluble film of the present invention has excellent balance between the water solubility and the mechanical strength and may be preferably used in various water-soluble film applications. Examples of such a water-soluble film include packaging films for chemicals, base films for hydraulic transfer printing, base films for embroidery, mold release films for artificial marble molding, packaging films for seeds, films for sanitary container bags, and the like.

Among them, the water-soluble film of the present invention is preferably used as the packaging films for chemicals to obtain even marked effects of the present invention.

In the case of applying the water-soluble film of the present invention to packaging films for chemicals, examples of the kind of chemical include pesticides, detergents (including bleaches), germicides, and the like. The properties of the chemicals are not particularly limited and may be acidic, neutral, or alkaline. The form of the chemicals may be in any of powder, bulk, gel, and liquid. The chemical may contain a boron-containing compound and a halogen-containing compound. The form of package is preferably, but not particularly limited to, unit packaging to package (preferably, seal package) the chemicals per unit amount. A package of the present invention is obtained by packaging a chemical by using the film of the present invention as a packaging film for chemicals.

EXAMPLES

Although the present invention is specifically described below by way of Examples and the like, the present invention is not at all limited by Examples below. It should be noted that evaluation items and methods thereof employed in Examples and Comparative Examples below were as follows.

(1) Crystal Long Period

The small-angle X-ray was measured before and after immersion of the water-soluble film thus formed in the water/methanol mixed solvent by the method described above, and the X-ray profile thus obtained was converted to a one-dimensional profile to calculate the crystal long period from peak top position.

(2-1) Complete Dissolution Time

The complete dissolution time when the water-soluble film was immersed in deionized water at 10° C. was measured as follows.

<1> The water-soluble film was left in a thermohygrostat conditioned at 20° C.-65% RH for 16 hours or more for humidity control.

<2> A rectangular sample with a length of 40 mm×a width of 35 mm was cut from the humidity controlled water-soluble film and then sandwiched for fixation between two 50 mm×50 mm plastic plates having a rectangular window (hole) with a length of 35 mm×a width 23 mm in a position where the longitudinal direction of the sample was parallel to the longitudinal direction of the window and the sample was approximately at the center in the window width direction.

<3> In a 500 mL beaker, 300 mL of deionized water was put and the water temperature was adjusted at 10° C. while stirring with a magnetic stirrer having a bar with a length of 3 cm at the number of revolutions of 280 rpm.

<4> The sample fixed to the plastic plates in <2> above was immersed in the deionized water in the beaker with attention not to contact the bar of the magnetic stirrer.

<5> The time (second) from the immersion in the deionized water to complete disappearance of the sample pieces dispersed in the deionized water was measured.

(2-2) State of Undissolved Film Residue Production

In a cloth bag of approximately 15 cm×15 cm prepared with black polyester fabric (thickness of 2 mm), the water-soluble film cut into 7 cm×7 cm was put and then the opening of the cloth bag was sewn. The bag was stirred in cold water at 10° C. in a 10 L bucket for 600 seconds. The cloth bag was then opened to check whether polymer residues were attached on the internal surfaces of the cloth bag.

Evaluation Criteria for Residue Production:
  A: No attachment of residues was visually confirmed, and no slimy feelings on the hand were reported upon touching.
  B: No residues were visually confirmed, but slight slimy feelings on the hand were reported upon touching.
  C: Attachment of the film residues on the fabric surfaces was readily confirmed visually.

(3) Readiness for Film Deformation

From the water-soluble film that was humidity controlled by leaving it in an environment at 20° C.-65% RH for two days, five test pieces with a length of 35 mm in the flow direction (MD) during film formation and a length of 3 mm in the width direction (TD) during the same were cut and set in a TMA (Model Q400, manufactured by TA Instruments) with an effective length of 20 mm in a state of applying a load of 0.098 N. After setting the test pieces, the temperature was raised from 20° C. to 80° C. at a rate of 10° C./minute and then retained at 80° C. for 60 minutes to measure a dimensional change rate relative to the effective length and to define the average value as the dimensional change rate in MD. Then, from the humidity controlled water-soluble film, five test pieces with a length of 3 mm in MD and a length of 35 mm in TD were cut and a dimensional change rate relative to the effective length was measured in the same manner as above to define the average value as the dimensional change rate in TD. Based on these values, the readiness for film deformation was evaluated by the following criteria.

A: Deformation rate of less than 8% in both MD and TD; the package hardly deformed.
  B: Deformation rate of less than 10% in both MD and TD and deformation rate of 8% or more in at least one of MD and TD; deformation of the package is as small as practically negligible.
  C: Deformation rate of 10% or more in at least one of MD and TD; deformation is large to cause a problem in practical use.

Example 1

A film forming stock solution having a ratio of volatile components of 60 mass % was prepared that was composed of 100 parts by mass of maleic acid monomethyl (hereinafter, may be referred to as MMM) modified PVA (degree of saponification of 96 mol %, degree of polymerization of 1700, amount of MMM modification of 5 mol %) obtained by saponifying polyvinyl acetate, 30 parts by mass of glycerin as the plasticizer, 2.0 parts by mass of lauric acid diethanolamide as the surfactant, and water. As the crosslinking agent, boric acid was added 0.5 mass % in terms of PVA. The stock solution was filtered and discharged in the form of film from a T die on a first drying roll (surface temperature of 80° C.) at a shearing rate of 207 s$^{-1}$, and hot air at 85° C. was blown for drying on the entire non-contact surface relative to the first drying roll at a rate of 5 m/second on the first drying roll, and then the film was released from the first drying roll. The film was then dried on second and later drying rolls at a surface temperature of approximately 75° C. in such a manner that one surface and the other surface of the PVA film alternately contacted the respective drying rolls and then the film was wound to obtain a water-soluble film (thickness of 35 μm and width of 1200 mm).

The film thus obtained was subjected to measurement of the crystal long period by SAXS, resulting in 9.4 nm. The crystal long period of the sample after immersion in the solvent (water/methanol) was 16.4 nm and the change rate was 74.9%. As a result of TEM evaluation of the readiness for film deformation, the dimensional change rate in the MD direction at 80° C. was 0.9% and the dimensional change rate in the TD direction was 1.4%, and thus the dimensional change was small and evaluated as A. The complete dissolution time of the film in cold water at 10° C. was 97 seconds and had no problem of water solubility. In the evaluation on undissolved film residue production, no residue attachment was found on the fabric surface and no slimy feelings were reported and thus evaluated as A.

Examples 2 and 3

Respective water-soluble films were obtained in the same manner as in Example 1 except for changing the amount of the plasticizer to 10 mass % and 50 mass %, respectively.

Examples 4 and 5

Respective water-soluble films were obtained in the same manner as in Example 1 except for using unmodified PVA having a degree of saponification of 88 mol % and acrylamide-2-methylpropanesulfonic acid sodium salt (hereinafter, may be referred to as AMPS) modified PVA having a degree of saponification of 88 mol % and a degree of modification 2 mol %, respectively.

Example 6

A water-soluble film was obtained in the same manner as in Example 1 except for not adding boric acid and changing the shearing rate for discharge from the T die to 465 $s^{-1}$.

Example 7

A water-soluble film was obtained in the same manner as in Example 1 except for changing the cross-linking agent, instead of boric acid, to 0.1 mass % of glutaraldehyde in terms of PVA.

Comparative Examples 1, 2, and 3

Respective water-soluble films were obtained in the same manner as in Example 1 except for changing the amount of boric acid to 0.01 mass %, 0 mass %, and 5 mass % in terms of PVA, respectively. The crystal long period, the complete dissolution time, the state of undissolved film residue production, and the readiness for film deformation of these water-soluble films were evaluated and found that Comparative Examples 1 and 2 had good water solubility while the dimensional change rates at 80° C. were large and deformation was concerned when formed into a pouch shape. While having a small dimensional change, Comparative Example 3 had poor water solubility, and in the undissolved film residue production evaluation, slight slimy feelings were reported upon touching the fabric surfaces with the hand.

Comparative Example 4

A water-soluble film was obtained in the same manner as in Example 1 except for using unmodified PVA having a degree of saponification of 99.9 mol %, adding no cross-linking agent, and changing the amount of the plasticizer to 11 mass %. The crystal long period, the complete dissolution time, the state of undissolved film residue production, and the readiness for film deformation of the water-soluble film were evaluated and found that, while the dimensional stability was excellent, the water solubility was poor and a large amount of undissolved residue attachments were produced.

Comparative Example 5

A water-soluble film was obtained in the same manner as in Example 1 except for changing the shearing rate for discharge from the T die to 74 $s^{-1}$. The crystal long period, the complete dissolution time, the state of undissolved film residue production, and the readiness for film deformation of the water-soluble film were evaluated and found that, while the water solubility was excellent, the dimensional stability was poor and the dimensional change rate was large.

The evaluation results of the measured films thus obtained are shown in Table 1.

TABLE 1

| | | Example 1 | Example 2 | Example 3 | Example 4 | Example 5 | Example 6 | Example 7 |
|---|---|---|---|---|---|---|---|---|
| Modification | | MMM Δ 5 | MMM Δ 5 | MMM Δ 5 | Unmodified | AMPS Δ 2 | MMM Δ 5 | MMM Δ 5 |
| Degree of Saponification [mol %] | | 96 | 96 | 96 | 88 | 88 | 96 | 91 |
| Amount of Plasticizer [mass %/PVA] | | 30 | 10 | 50 | 25 | 25 | 30 | 25 |
| Cross-Linking Agent | | Boric Acid | Boric Acid | Boric Acid | Boric Acid | Boric Acid | Boric Acid | GA |
| Amount of Cross-Linking Agent (mass %/vs PVA) | | 0.5 | 0.5 | 0.5 | 0.5 | 0.5 | 0 | 0.1 |
| Shearing Rate ($s^{-1}$) | | 207 | 207 | 207 | 207 | 207 | 465 | 207 |
| SAXD | Long Period (Before Immersion) [nm] | 9.4 | 9.1 | 9.9 | 10.1 | 14.1 | 9.8 | 10.1 |
| | Long Period (After Immersion) [nm] | 16.4 | 14.5 | 182 | 13.4 | 21.8 | 18.3 | 13.9 |
| | Long Period Change Rate [%] | 74.9 | 59.3 | 83.8 | 32.4 | 54.1 | 86.7 | 37.6 |
| Dimensional Change Rate @ 80° C. [%] | MD | 0.9 | 0.9 | 2.2 | 1.5 | 3.5 | 4.2 | 0.5 |
| | TD | 1.4 | 1.3 | 2.9 | 2.1 | 3.9 | 5.1 | 1.0 |
| | Evaluation | A | A | A | A | A | A | A |
| 10° C. Dissolution Time (s) | | 97 | 110 | 72 | 80 | 92 | 86 | 105 |
| Residue Production | | A | A | A | A | A | A | A |

TABLE 1-continued

|  |  | Comparative Example 1 | Comparative Example 2 | Comparative Example 3 | Comparative Example 4 | Comparative Example 5 |
|---|---|---|---|---|---|---|
| Modification |  | MMM Δ 5 | MMM Δ 5 | MMM Δ 5 | Unmodified | MMM Δ 5 |
| Degree of Saponification [mol %] |  | 96 | 96 | 96 | 99.9 | 96 |
| Amount of Plasticizer [mass %/PVA] |  | 30 | 30 | 30 | 11 | 30 |
| Cross-Linking Agent |  | Boric Acid | — | Boric Acid | — | Boric Acid |
| Amount of Cross-Linking Agent (mass %/vs PVA) |  | 0.01 | 0 | 5 | 0 | 0.5 |
| Shearing Rate ($s^{-1}$) |  | 207 | 207 | 207 | 207 | 74 |
| SAXD | Long Period (Before Immersion) [nm] | 11.3 | 12.2 | 9.8 | 13.2 | 10.1 |
|  | Long Period (After Immersion) [nm] | 31.2 | 33.6 | 12.4 | 16.0 | 25.5 |
|  | Long Period Change Rate [%] | 176.1 | 174.6 | 26.5 | 21.2 | 152.5 |
| Dimensional Change Rate @ 80° C. [%] | MD | 10.5 | 9.9 | 0.3 | 0.1 | 15.8 |
|  | TD | 11.4 | 3.2 | 0.8 | 0.1 | 17.6 |
|  | Evaluation | C | C | A | A | C |
| 10° C. Dissolution Time (s) |  | 23 | 20 | 250 | >600 | 40 |
| Residue Production |  | A | A | B | C | A |

As clearly seen from Table 1, the water-soluble film of the present invention is excellent in water solubility and less likely to leave undissolved residues and has excellent deformation resistance during pouch storage. In addition, use of the water-soluble film of the present invention for a package to contain a chemical and the like allows production of a package in which deformation of the package, in particular deformation in a state of high temperature and high humidity, is suppressed and attachment of undissolved residues is also suppressed.

The invention claimed is:

1. A water-soluble film comprising at least one polyvinyl alcohol-based resin, wherein
    the water-soluble film has a crystal long period Ds from 10.0 to 30.0 nm as obtained from an X-ray profile obtained by small-angle X-ray scattering measurement of the water-soluble film after immersion in a water/methanol mixed solvent at a volume ratio: 2/8, and
    a rate of increase (Ds−Da)/Da of the crystal long period Ds to a crystal long period Da obtained by the small-angle X-ray scattering measurement before the immersion in the mixed solvent is 30% or more and 130% or less.

2. The water-soluble film according to claim 1, wherein the water-soluble film excludes starch.

3. The water-soluble film according to claim 1, wherein the water-soluble film further comprises a crosslinker, and the crosslinker includes an aldehyde, a boron-based material, or both.

4. The water-soluble film according to claim 3, wherein the crosslinker includes boric acid.

5. The water-soluble film according to claim 3, wherein the crosslinker includes glutaraldehyde.

6. The water-soluble film according to claim 1, wherein the polyvinyl alcohol-based resin is obtained by saponifying a vinyl ester-based polymer including at least one monomer unit formed from vinyl formate, vinyl acetate, vinyl propionate, vinyl valerate, vinyl laurate, vinyl stearate, vinyl benzoate, vinyl pivalate, vinyl versatate, or combinations thereof.

7. The water-soluble film according to claim 6, wherein the vinyl ester-based polymer further includes at least one co-monomer unit formed from an olefin having 2 to 30 carbon atoms, an acrylic acid, an acrylic acid salt, an acrylic ester, a methacrylic acid, a methacrylic salt, a methacrylic ester, an acrylamide, an acrylamide derivative, a methacrylamide, a methacrylamide derivative, an N-vinylamide, a vinyl ether, a vinyl cyanide, a vinyl halide, an allyl compound, a maleic acid, a maleic acid salt, a maleic acid ester, a maleic acid anhydride, an itaconic acid, an itaconic acid salt, itaconic acid ester, an itaconic acid anhydride, a vinylsilyl compound, or isopropenyl acetate.

8. The water-soluble film according to claim 7, wherein the vinyl ester-based polymer includes at least one co-monomer unit formed from the maleic acid ester.

9. The water-soluble film according to claim 8, wherein the maleic acid ester is maleic acid monomethyl.

10. The water-soluble film according to claim 7, wherein the vinyl ester-based polymer includes at least one co-monomer unit formed from the acrylamide derivative.

11. The water-soluble film according to claim 10, wherein the acrylamide derivative is acrylamide-2-methylpropane-sulfonic acid sodium salt.

12. The water-soluble film according to claim 1, comprising two or more polyvinyl alcohol-based resins having different degree of polymerization, degree of saponification, degree of modification, or combinations thereof.

13. The water-soluble film according to claim 1, wherein the water-soluble film is formed from a film forming stock solution having volatile components at a concentration of 50 to 90 mass %.

14. The water-soluble film according to claim 13, wherein the water-soluble film is formed by casting the film forming stock solution on a support having a surface temperature of 50° C. to 110° C.

15. The water-soluble film according to claim 1, wherein the water-soluble film is formed from a film forming stock solution having volatile components at a concentration of 55 to 80 mass %.

16. The water-soluble film according to claim 15, wherein the water-soluble film is formed by casting the film forming stock solution on a support having a surface temperature of 65° C. to 95° C.

17. A package comprising: the water-soluble film according to claim 1 and a chemical contained using the water-soluble film.

18. The package according to claim 17, wherein the chemical is a pesticide, a detergent, or a germicide.

19. The package according to claim 17, wherein the chemical is in a liquid form.

\* \* \* \* \*